(12) United States Patent
Gurudoss et al.

(10) Patent No.: US 11,150,778 B2
(45) Date of Patent: *Oct. 19, 2021

(54) SYSTEM AND METHOD FOR VISUALIZATION OF HISTORY OF EVENTS USING BIM MODEL

(71) Applicant: Honeywell International Inc., Morris Plains, NJ (US)

(72) Inventors: Malayappan Gurudoss, Kumbakonam (IN); Vinoth Dharmalingam, Erode (IN); Kalpana Janapati, Cuddapah (IN); Viswanathan Chatapuram Krishnan, Madurai (IN); Vinay Venkatesh, Bangalore (IN); Paul M. Popowski, Lake Mills, WI (US)

(73) Assignee: Honeywell International Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/355,369

(22) Filed: Mar. 15, 2019

(65) Prior Publication Data

US 2019/0212898 A1 Jul. 11, 2019

Related U.S. Application Data

(63) Continuation of application No. 15/189,128, filed on Jun. 22, 2016, now Pat. No. 10,241,640, which is a (Continued)

(51) Int. Cl.
*G06F 3/0481* (2013.01)
*G08B 13/196* (2006.01)
(Continued)

(52) U.S. Cl.
CPC ........ *G06F 3/04815* (2013.01); *G06F 3/0481* (2013.01); *G06F 3/04842* (2013.01); (Continued)

(58) Field of Classification Search
None
See application file for complete search history.

(56) References Cited

U.S. PATENT DOCUMENTS 6,989,745 B1 * 1/2006 Milinusic ......... G08B 13/19604
340/501
8,468,562 B2 6/2013 Miller et al.
(Continued)

FOREIGN PATENT DOCUMENTS

CN 101681194 A 3/2010

OTHER PUBLICATIONS

First Office Action and Search Report from corressponding CN patent application 201410589252.2, dated Feb. 20, 2017.
(Continued)

*Primary Examiner* — Kate H Luo
(74) *Attorney, Agent, or Firm* — Seager, Tufte & Wickhem, LLP

(57) ABSTRACT

A method and apparatus including the steps of a building information model (BIM) of a security system providing a three-dimensional view of a secured area of the security system including the physical location of any sensors of the security system, an input device of the security system receiving from a user a starting time and ending time of a time interval of interest and a processor of the security system displaying the three-dimensional view of the secured area including a time scale showing the starting time on one end of the time scale and the ending time at an opposing end of the time scale and a respective popup of details for each corresponding sensor of at least some sensors of the security system activated during the time interval of interest, each respective popup graphically connected to the physical location of the corresponding sensor within the three dimensional view.

16 Claims, 5 Drawing Sheets

Related U.S. Application Data continuation of application No. 13/962,228, filed on Aug. 8, 2013, now Pat. No. 9,412,245.

(51) Int. Cl.
  *H04N 5/91* (2006.01)
  *G08B 25/14* (2006.01)
  *G06F 3/0484* (2013.01)
  *G06T 19/00* (2011.01)
  *H04N 7/18* (2006.01)

(52) U.S. Cl.
  CPC ........ *G06F 3/04847* (2013.01); *G06T 19/003* (2013.01); *G08B 13/19691* (2013.01); *G08B 13/19697* (2013.01); *G08B 25/14* (2013.01); *H04N 5/91* (2013.01); *H04N 7/181* (2013.01); *G06T 2200/24* (2013.01)

(56) References Cited

U.S. PATENT DOCUMENTS

| | | | | |
|---|---|---|---|---|
| 2003/0025599 | A1* | 2/2003 | Monroe | G08B 13/19684 340/531 |
| 2005/0169367 | A1* | 8/2005 | Venetianer | G08B 13/19673 375/240.01 |
| 2007/0008099 | A1* | 1/2007 | Kimmel | G08B 13/19656 340/506 |
| 2008/0285940 | A1* | 11/2008 | Kulas | H04N 21/47205 386/248 |
| 2009/0134968 | A1* | 5/2009 | Girgensohn | G08B 13/19613 340/3.1 |
| 2009/0251537 | A1* | 10/2009 | Keidar | H04N 7/181 348/143 |
| 2010/0002082 | A1* | 1/2010 | Buehler | G08B 13/19693 348/159 |
| 2010/0118147 | A1* | 5/2010 | Dorneich | H04N 21/2187 348/155 |
| 2011/0178775 | A1* | 7/2011 | Schoning | G06F 11/28 702/190 |
| 2012/0050479 | A1* | 3/2012 | Karaoguz | H04N 13/111 348/46 |
| 2012/0194336 | A1* | 8/2012 | Thiruvengada | G08B 13/19682 340/525 |
| 2013/0027561 | A1 | 1/2013 | Lee et al. | |
| 2013/0039634 | A1* | 2/2013 | M | G08B 13/19682 386/230 |
| 2013/0091432 | A1* | 4/2013 | Shet | G06F 16/532 715/719 |
| 2013/0124997 | A1* | 5/2013 | Speir | H04N 21/2747 715/721 |
| 2013/0293718 | A1* | 11/2013 | M | G08B 13/19671 348/152 |
| 2014/0050455 | A1* | 2/2014 | Ni | H04N 7/181 386/224 |

OTHER PUBLICATIONS

English-language translation of first office action and search report from corresponding CN patent application 201410589252.2, dated Feb. 20, 2017.

English language translation of abstract for CN patent application 101681194, dated Mar. 24, 2010.

Extended European search report for corresponding EP patent application 14178599.8, dated Oct. 18, 2016.

Feb. 16, 2016 Canadian Office Action corresponding to Canadian Application No. 2,857,886.

* cited by examiner

SYSTEM AND METHOD FOR VISUALIZATION OF HISTORY OF EVENTS USING BIM MODEL

This application is a continuation of U.S. application Ser. No. 15/189,128 filed Jun. 22, 2016, which is a continuation of U.S. application Ser. No. 13/962,228 filed Aug. 8, 2013, now U.S. Pat. No. 9,412,245, issued Aug. 9, 2016, both of which are hereby incorporated by reference.

FIELD

The field relates to security systems and more particularly to methods of tracking events within security systems.

BACKGROUND

Security systems for the protection of homes and/or businesses are generally known. Such systems typically involve the use of one or more sensors located on the doors or windows surrounding a secured area for the detection of intruders.

The sensors of a security system are typically monitored via an alarm panel either located within the home or business or at a central monitoring station. Upon activation of one of the sensors, the alarm panel may activate an alarm.

While some security systems may be monitored by a full time security guard, many security systems are only monitored indirectly via the reporting of security events to a central monitoring station. Upon detecting an alarm, the guard or central monitoring station may respond by summoning the police.

In most cases, security events are typically saved into an event file including an identifier of the sensor raising the alarm and a time of activation of the sensor. The event files are important during any investigation into events in order to determine how an intruder entered the secured area and the identity of the intruder.

While existing security systems work well, the security events saved into the event files are difficult to read and interpret. Accordingly, a need exists for better methods of recording and presenting such events.

DETAILED DESCRIPTION OF AN ILLUSTRATED EMBODIMENT

Figure 1:
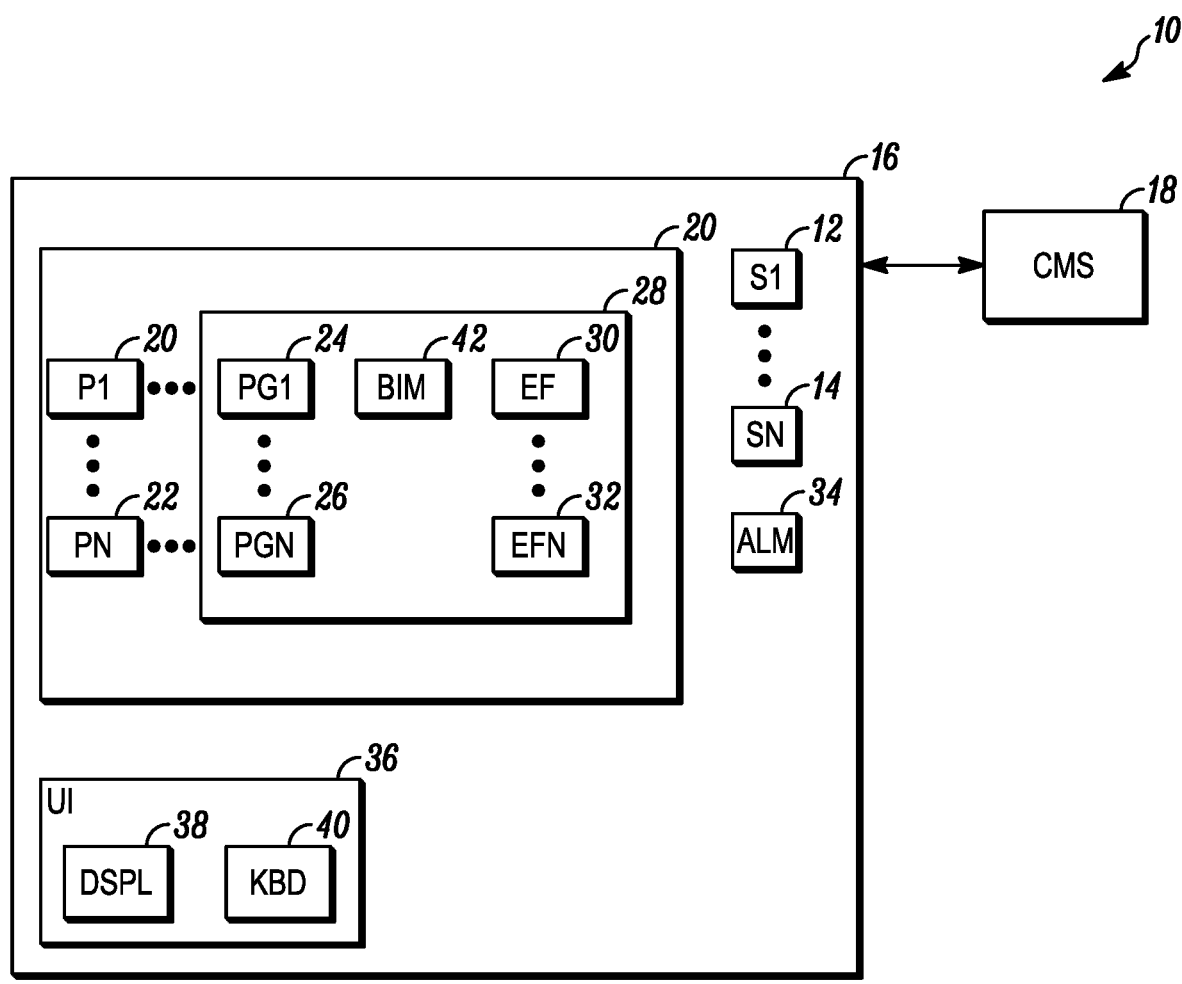
FIG. 1 is a block diagram of a security system shown generally in accordance with an illustrated embodiment.

While embodiments can take many different forms, specific embodiments thereof are shown in the drawings and will be described herein in detail with the understanding that the present disclosure is to be considered as an exemplification of the principles hereof, as well as the best mode of practicing same. No limitation to the specific embodiment illustrated is intended.

FIG. 1 is a block diagram of a security system 10 shown generally in accordance with an illustrated embodiment. Included within the system is a number of sensors 12, 14 used to protect a secured area 16. The sensors may be limited switches mounted on doors and/or windows located along a periphery of the secured area that detect entry of intruders into the secured area. The sensors could also be motion detectors based upon passive infrared (PIR) devices or cameras that perform video processing of video images to detect changes between successive frames. The sensors could also be environmental detectors based upon any of a number of different technologies (e.g., smoke detectors, carbon monoxide detectors, natural gas detectors, etc.).

The sensors may be monitored by a control panel 20 located within the secured area or within a central monitoring station 18. Upon detecting activation of one of the sensors (either directly where the control panel is located at the central monitoring station or via a message sent to the central monitoring station where the control panel is located within the secured area), the central monitoring station may respond by summoning the appropriate help (e.g., police, fire department, etc.).

Located within the control panel may be one or more processor apparatus (processors) 20, 22, each operating under control of one or more computer programs 24, 26 loaded from a non-transitory computer readable medium (memory) 28. As used herein, reference to a step performed by a program is also reference to the processor that executed that step.

Included within the control panel is an alarm processor that monitors the status of each of the sensors. Upon detection of activation of one of the sensors, the alarm processor may activate a local alarm 34 to notify authorized occupants of the secured area and may also summon help.

Also located within the control panel may be an event processor. Upon activation of one of the sensors, the event processor saves an event into an event file 30, 32 or may add an entry into a preexisting event file within memory. The entry may include an identifier of the activated sensor and a time of the event.

Also associated with the secured area is a user interface 36. The user interface may include an interactive display 38 or a display and separate keyboard 40. The user interface may be located on the control panel where the control panel is located within the secured area or may be a stand-alone device.

The user interface may be used to arm or disarm the security system protecting the secured area. The user interface may also display alarm events. In order to arm or disarm the system, an authorized user may enter a personal identification number (PIN) and a function key (e.g., arm, arm away, disarm, etc.). The user interface may respond with a graphical indicator showing the status of the local alarm system.

In addition to the user interface, the security system may also include sensors that allow access into the secured area by authorized users. In this case, at least one of the sensors could be a card reader that reads an identify card carried by an authorized user and grants access into the secured area.

Also included within the security system is a building information model (BIM) 42. The BIM may contain three-dimensional views of the secured area along with geographical coordinates of each of the sensors within the secured area.

Figure 5:
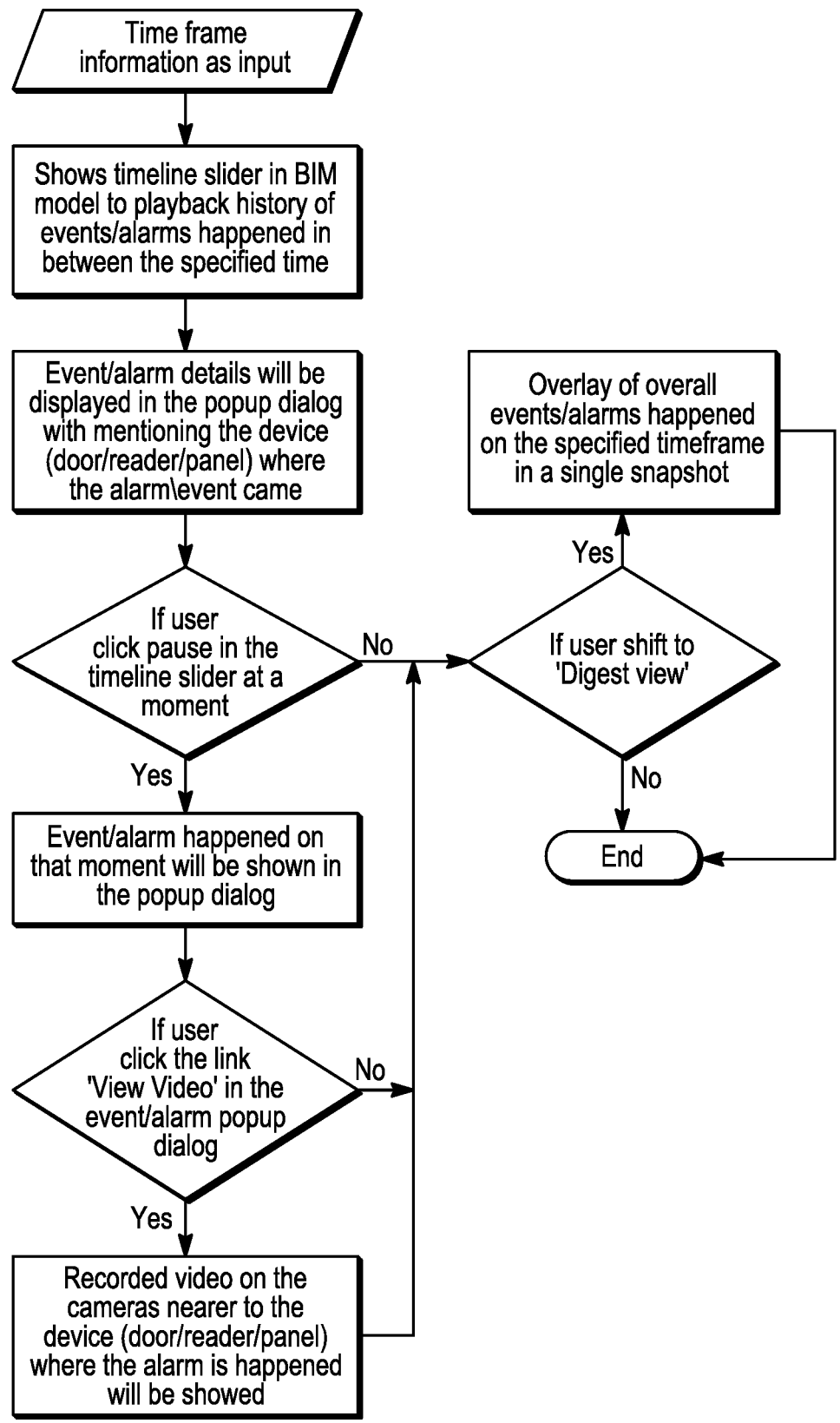
FIG. 5 shows a set of method steps that may be used by the system of FIG. 1.

The BIM is used along with the event files by an event display system including one or more event processors 20, 22 to display events on the user interface under a process shown generally in FIG. 5. For example, the user may enter a time through the user interface and the event processor may display events that happened at that time on a three-dimensional view of the secured area or portion of the secured area along with a graphical indicator on the three dimensional view that indicates where that event occurred. A respective popup may also be displayed that includes information about the event. Alternatively, the user may identify a time interval of interest by entering a starting time and ending time and the video processor may show the events that occurred within that time period. A sequence processor may also play back the events in the sequence as they occurred.

Figure 2:
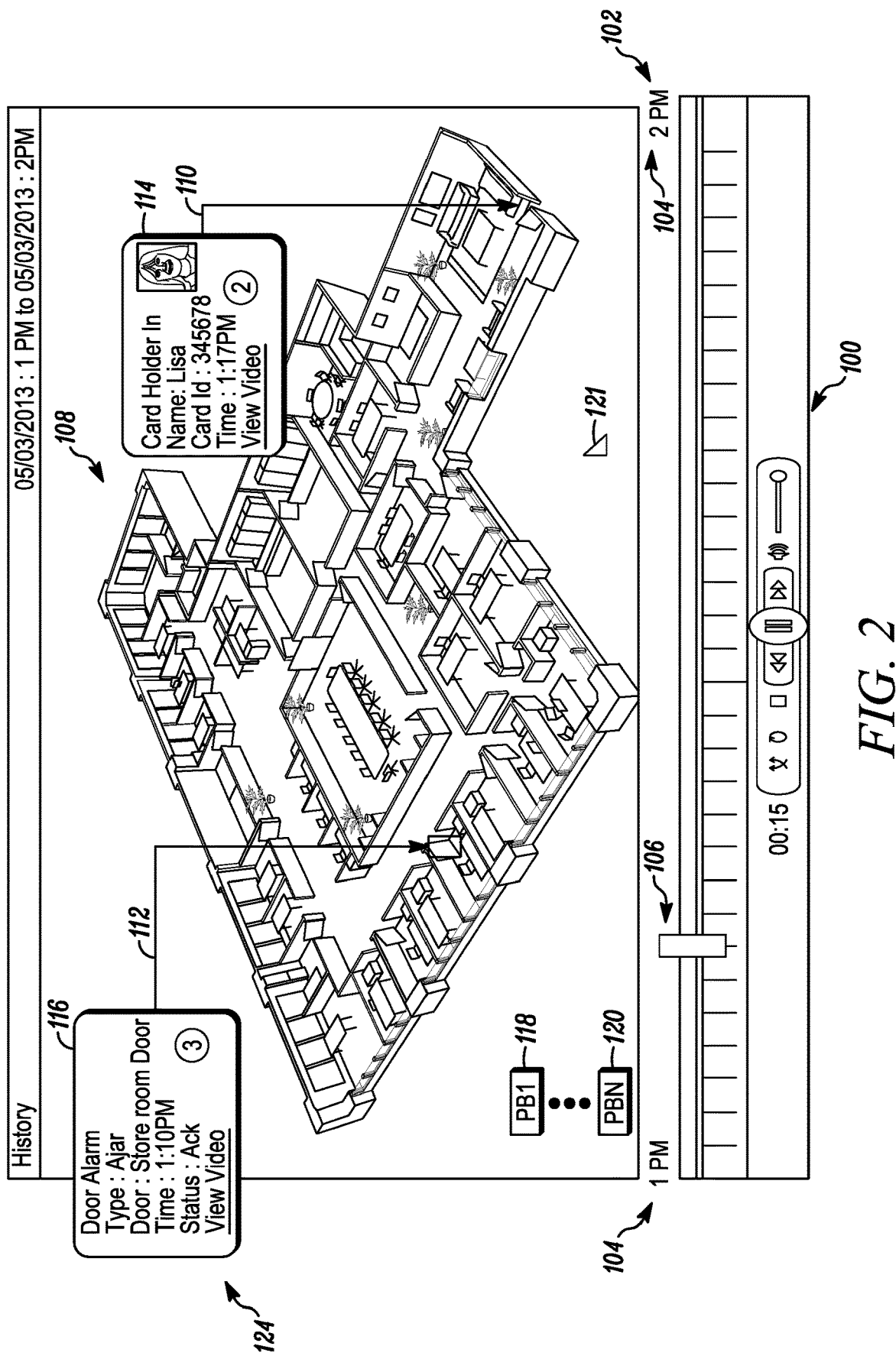
FIG. 2 depicts a screen that may be shown on a display of the system of FIG. 1.

FIG. 2 depicts a screen 100 shown on the display by one or more of the event processors. The screen may include a number of information elements. For example, the screen may include a time scale 102 including the entered start time 104 and end time 104. The time scale may also include a time indicator 106.

Also included within the screen may be one or more graphical indicators 110, 112 that show the geographical locations of sensors activated between the start time and the location of the indicator 106 on the time scale. Associated with the graphical indicators may be a respective popup 114, 116 that shows information associated with the respective event. In this regard, the popup may show an identifier of the alarm, the type of alarm, the time and the status. A circled indicator may show the total number of alarms/alerts from the sensor during some predetermined time period.

The screen of FIG. 2 may also include one or more function buttons 118, 120. The function buttons may be used to control the format of information displayed in conjunction with that time interval. For example, one of the function buttons may be a playback button that plays back events as they occurred within the selected area.

In order to use the event display system, the user may first click on an icon of the BIM model displayed on the display of the user interface. In response, a display processor may show a three-dimensional view of the entire secured area including an interactive window through which the user may enter starting and ending times. In the case where the secured area is a multistory building, the three-dimensional view may include a three-dimensional representation of the multi-story building. The user may select one of the stories using a cursor 121 and be presented with the three-dimensional view of one of the stories of the building. The user may enter a start and end time and activate an enter button resulting in a display such as that shown in FIG. 2.

The user may select the time indicator using the cursor and drag the time indicator across the time scale. As the time indicator is dragged across the time scale, a time processor identifies any activated sensors that had been activated between the start time and current location of the time indicator and displays them on the screen including a popup and graphical indicator location showing the location of the sensor within the three-dimensional view.

Alternatively, the user may select a playback button of the function buttons. In this case, the playback processor increments the location of the time indicator at some rate (e.g., 1:1 for playback at the same rate as the events occurred; 2:1 for playback at twice the rate, etc.). In response, the time indicator automatically moves across the time scale incrementally displaying events based upon the location of the time indicator.

As the indicator moves across the time scale, the operator may activate a pause button of the function pushbuttons. While paused, the user may activate a view video pushbutton 124 on any of the popups. Activating the view video pushbutton causes a video processor to retrieve a sequence of video images from one or more cameras that were previously identified within the BIM as capturing images associated with the activated sensor.

Figure 3:
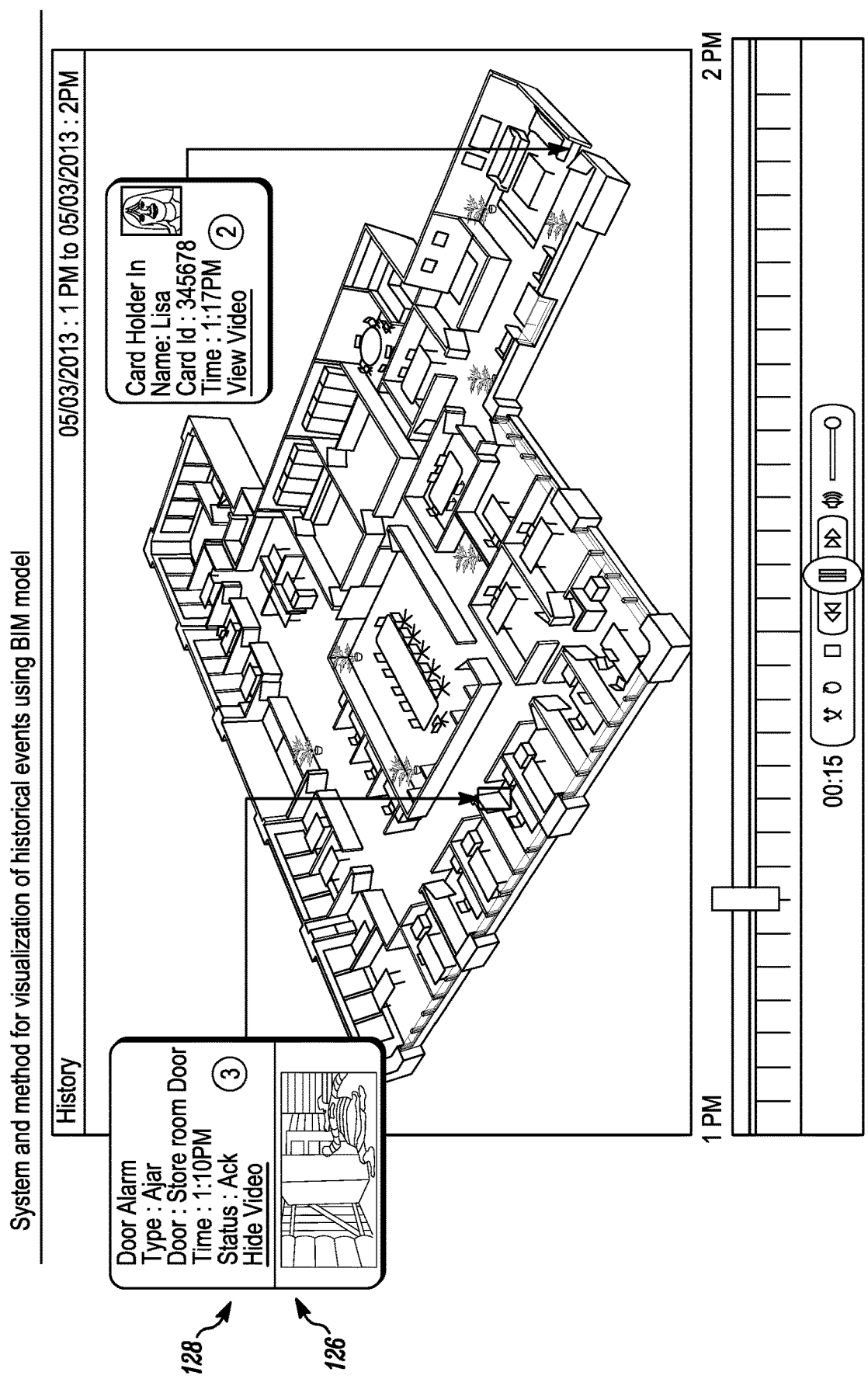
FIG. 3 depicts a screen showing video from the system of FIG. 1.

Once activated, the video processor may display a sequence of images from a predetermined time period before activation of the corresponding sensor until a predetermined time after activation of the sensor. The images may be displayed within a separate window 126 of the popup as shown in FIG. 3.

Once the user has viewed the images associated with the activated sensor, the user may activate a hide video pushbutton 128. In response, the screen may return to the view of FIG. 2. Alternatively, the user may double click on the displayed view and receive a full screen view of the recorded video showing activation of the sensor.

Figure 4:
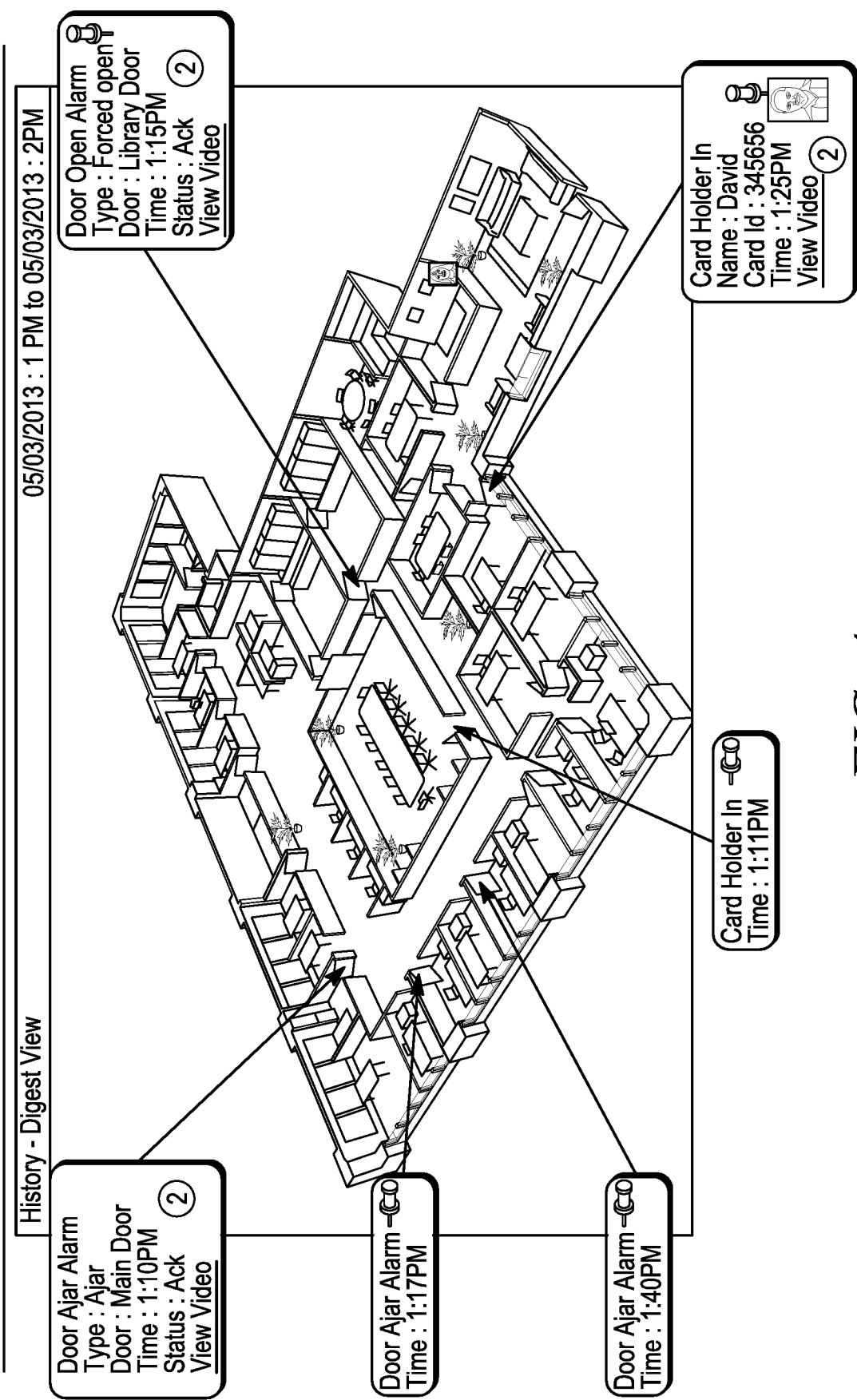
FIG. 4 depicts a digest view of events from the system of FIG. 1.

In addition to viewing video, the user may also activate a digest view pushbutton of the function pushbuttons. In this case, a digest view processor may retrieve and display a history of all activated sensors over some much larger time period as shown in FIG. 4.

In general, the system provides the functionality where all of the events/alarms of the system may be displayed in a specified timeframe. A BIM of the building or other secured area may be used to do this. The display of the system may have a timeline slider used in conjunction with a display under the BIM to playback the history of events/alarms that happened between the limits of the specified time.

The user can choose the timeframe to view the history of alarms/events in the floor/premises of the building using the BIM. In response, the system will play back the history of events/alarms within a 3-D display provided under the BIM of the specified floor/premises by highlighting the device (door/reader/panel). In this regard, any activated sensor may be highlighted with different colors according to the priority of the alarm. The details of that event/alarm are also displayed nearby on the model using an associated window like a popup dialog with the count of the alarm/event that happened from the start to end times of the timeframe.

A user can pause the history timeline at any time to view the events/alarms that happened at that moment and can click on the event/alarm in the popup dialog to see more detail about the alarm. The user can also view the recorded video on the camera nearest the device (door/reader/panel) where the alarm has occurred.

FIG. 2 shows the timeline slider with play/pause option for the time between 1 pm and 2 pm using the BIM of a building. The alarms/events that happened between the time limits in that time frame with their details and their count from the start time of the timeframe are shown as a popup dialog box in the diagram. The device from which the alarm/event originated is highlighted with different colors based on its priority.

FIG. 3 depicts details of how a user may view the recorded video from a camera near the device (door/reader/panel) where the alarm/event occurred. The recorded video of the particular event/alarm is viewed by expanding the link "view video" in the event/alarm popup as shown.

FIG. 4 depicts the "digest view" where a user can view the overlay of all events/alarms that happened during the specified timeframe in a single snapshot view. The user can drill down to see details about individual alarms/events by expanding the popup. The user can open and review the recorded video of that particular event.

The user can instantly shift from the history timeline view to "digest view" if the user wants to see the total count of events/alarms of various devices. The user can switch back and forth between views as and when needed.

The system also includes a "digest view" where a user can view the overlay of all events/alarms that happened on the specified timeframe in a single snapshot view. In the event/alarm popup, the count of alarms/events that happened on the device from the start time of the timeframe will be displayed. The user can drill down to see details about individual alarms/events by expanding the popup. The user can open and review the recorded video of that particular event.

The system solves the problem of viewing alarms/events in a number of ways. First, by providing the play/pause timeline slider for the history of events/alarms in the BIM, the user can visually identify what, when and where an alarm/event occurred. Second, by specifying the count of alarms/events that happed in a time frame, a user can easily identify which region of the building is more alarm prone. By providing a method to view the recorded video from the cameras nearest the areas where an alarm happened in the BIM model itself, a user is more location aware of the context of the alarm/event. By using the "digest view", a user can view the overlay of all events/alarms that happened on the specified timeframe in a single snapshot view.

In general, the system may operate by using a set of steps including a building information model (BIM) of a security system providing a three-dimensional view of a secured area of the security system, including the physical location of any sensors of the security system, an input device of the security system receiving from a user a starting time and ending time of a time interval of interest, and a processor of the security system displaying the three-dimensional view of the secured area, including a time scale showing the starting time on one end of the time scale and the ending time at an opposing end of the time scale and a respective popup of details for each corresponding sensor of at least some sensors of the security system activated during the time interval of interest, each respective popup graphically connected to the physical location of the corresponding sensor within the three dimensional view.

The system may accomplish these steps using an apparatus including a building information model (BIM) of a security system embodied in a non-transient computer readable medium, wherein the BIM provides a three-dimensional view of a secured area of the security system, including the physical location of any sensors of the security system, an input device of the security system that receives from a user a starting time and ending time of a time interval of interest and a processor of the security system that displays the three-dimensional view of the secured area including a time scale showing the starting time on one end of the time scale and the ending time at an opposing end of the time scale and a respective popup of details for each corresponding sensor of at least some sensors of the security system activated during the time interval of interest, each respective popup graphically connected to the physical location of the corresponding sensor within the three dimensional view.

In alternate embodiments, the system may include a security system that protects a secured area, a building information model (BIM) of the security system embodied in a non-transient computer readable medium, wherein the BIM provides a three-dimensional view of the secured area of the security system, including the physical location of a plurality of sensors of the security system, an input device of the security system that receives from a user a starting time and ending time of a time interval of interest and a processor of the security system that displays the three-dimensional view of the secured area, including a time scale showing the starting time on one end of the time scale and the ending time at an opposing end of the time scale and a respective popup of details for each corresponding sensor of the plurality of sensors that were activated during the time interval of interest, each respective popup graphically connected to the physical location of the corresponding sensor within the three dimensional view.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims.

The invention claimed is:

1. A method comprising:
  detecting a plurality of alarms triggered by a plurality of sensors of a security system distributed about a secured area, the plurality of sensors comprising two or more types of sensors including one or more non-video based sensor, and the plurality of alarms including a plurality of alarm types;
  storing the alarms and respective data for each of the alarms, wherein the respective data for each of the alarms includes a respective alarm type, a sensor location of the respective one of the plurality of sensors that detected a respective one of the alarms, and a respective alarm time when the respective one of the plurality of sensors detected the respective one of the alarms;
  displaying, on a user interface device, a building information model of the secured area;
  receiving first user input indicative of a specified time interval that includes a starting time and an ending time;
  after receiving the first user input, superimposing a respective indicator for each of the sensors with alarms detected during the specified time interval on at least part of the building information model, wherein the respective indicator for each of the sensors with alarms detected during the specified time interval includes a respective popup window, wherein the respective popup window displays the respective alarm type and the respective alarm time for at least one of the alarms detected by the corresponding sensor during the specified time interval, and a respective total number of alarms detected by the corresponding sensor during the specified time interval; and
  wherein at least one of the plurality or sensors includes a first video camera, and wherein the respective popup window for the first video camera includes a link to a recorded video from the first video camera taken at the respective alarm time of the respective alarm.

2. The method of claim 1, wherein the respective indicator for each of the sensors with alarms detected during the specified time interval includes a graphical pointer that identifies the sensor location of the respective one of the plurality of sensors on the building information model.

3. The method of claim 1, wherein at least one of the plurality or sensors includes a second video camera, and wherein the respective popup window for the second video camera includes a recorded video from the second video camera taken at the respective alarm time of the respective alarm.

4. The method of claim 1, wherein at least part of the respective indicators for the alarms detected during the specified time interval are superimposed on at least part of the building information model in a time sequence that corresponds to the respective time when the respective one of the plurality of sensors detected the respective one of the alarms.

5. The method of claim 4, further comprising:
displaying a time scale;
displaying a time indictor on the time scale; and
receiving a second input from the user instructing the time indicator to move along the time scale at a predetermined rate, wherein the ending time is automatically set to the current position of the time indicator along the time scale.

6. The method of claim 4, further comprising:
receiving a third input instructing the time indicator to pause at a selected position along the time scale.

7. The method of claim 1, wherein the respective indicator for each one of the alarms detected during the specified time interval are concurrently superimposed on at least part of the building information model.

8. A system comprising:
a memory device that stores a plurality of alarms and respective data for each of the alarms, wherein two or more alarms are triggered by sensors of a different sensor type including a non-video sensor type, and the plurality of alarms including a plurality of alarm types, wherein the respective data for each of the alarms includes a respective alarm type, a sensor location for the respective sensor that detected the alarm, and a respective alarm time when the alarm was triggered;
a user interface device;
a programmable processor;
executable control software,
wherein the programmable processor and the executable control software cause the user interface device to:
display a building information model of at least part of the building;
wherein the user interface device receives first user input indicative of a specified time interval including a starting time and an ending time;
wherein, responsive to receiving the first user input, superimposing a respective indicator for each of the sensors with alarms detected during the specified time interval on at least part of the building information model, wherein the respective indicator for each of the sensors with alarms detected during the specified time interval includes the respective alarm type and the respective alarm time for at least one of the alarms detected by the corresponding sensor during the specified time interval, and a respective total number of alarms detected by the corresponding sensor during the specified time interval; and
wherein at least one of the plurality or sensors includes a first video camera, and wherein the respective popup window for the first video camera includes a link to a recorded video from the first video camera taken at the respective alarm time of the respective alarm.

9. The system of claim 8, wherein the respective indicator for at least some of the alarms detected during the specified time interval include a graphical pointer that identifies the sensor location of the respective one of the plurality of sensors on the building information model.

10. The system of claim 8, wherein the respective indicator for at least some of the sensors with alarms detected during the specified time interval includes a respective popup window, wherein the respective popup window displays the respective alarm type, and the respective alarm time.

11. The system of claim 8, wherein the respective indicator for the first video camera includes a respective popup window, and wherein the respective popup window for the first video camera includes the link to the recorded video from the first video camera taken at the respective alarm time of the respective alarm.

12. The system of claim 8, wherein at least one of the plurality or sensors includes a second video camera, and wherein the respective indicator for the second video camera includes a respective popup window, wherein the respective popup window for the second video camera includes a recorded video from the second video camera taken at the respective alarm time of the respective alarm.

13. The system of claim 8, wherein at least part of the respective indicators for the alarms detected during the specified time interval are superimposed on at least part of the building information model in a time sequence that corresponds to the respective time when the respective one of the alarms was triggered.

14. The system of claim 13, wherein the programmable processor and the executable control software cause the user interface device to:
display a time scale;
display a time indictor on the time scale;
receive a second input from the user instructing the time indicator to move along the time scale at a predetermined rate, wherein the ending time is automatically set to the current position of the time indicator along the time scale.

15. The system of claim 8, wherein the respective indicator for each one of the alarms detected during the specified time interval are concurrently superimposed on at least part of the building information model.

16. A non-transient computer-readable medium comprising instructions that when executed by a processor executes a process comprising:
detecting a plurality of alarms triggered by a plurality of designated sensors distributed about a building, the plurality of sensors comprising two or more types of sensors including one or more non-video based sensor, and the plurality of alarms including a plurality of alarm types;
storing the alarms and respective data for each of the alarms, wherein the respective data for each of the alarms includes a respective alarm type, a sensor location of the respective one of the plurality of sensors that detected a respective one of the alarms and a respective alarm time when the respective one of the plurality of sensors detected the respective one of the alarms;
displaying, on a user interface device, a building information model of at least part of the building;
receiving first user input indicative of a specified time interval that includes a starting time and an ending time;
after receiving the first user input, displaying a respective indicator for each of the sensors with alarms detected during the specified time interval, wherein the respective indicator for at least some of the sensors with alarms detected during the specified time interval includes a graphical pointer that identifies the sensor location of the respective one of the plurality of sensors on the displayed building information model, and wherein the respective indicator for each of the sensors with alarms detected during the specified time interval includes a respective popup window, wherein the respective popup window displays the respective alarm type and the respective alarm time for at least one of the alarms detected by the corresponding sensor during the specified time interval, and a respective total number of alarms detected by the corresponding sensor during the specified time interval; and wherein at least one of the plurality or sensors includes a video camera, and wherein the respective popup window for the video camera includes a link to a recorded video from the video camera taken at the respective alarm time of the respective alarm.

\* \* \* \* \*